Figure 6:
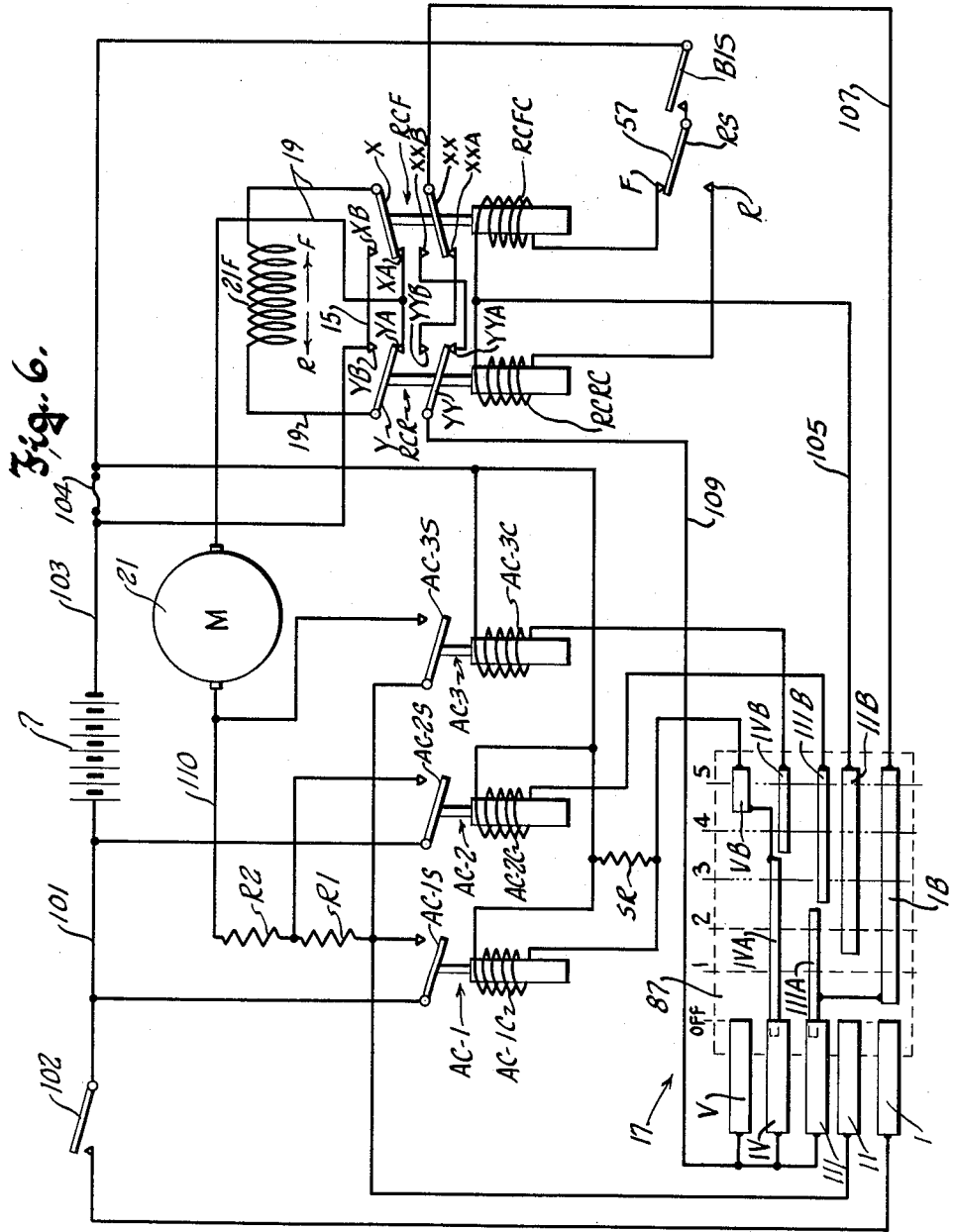

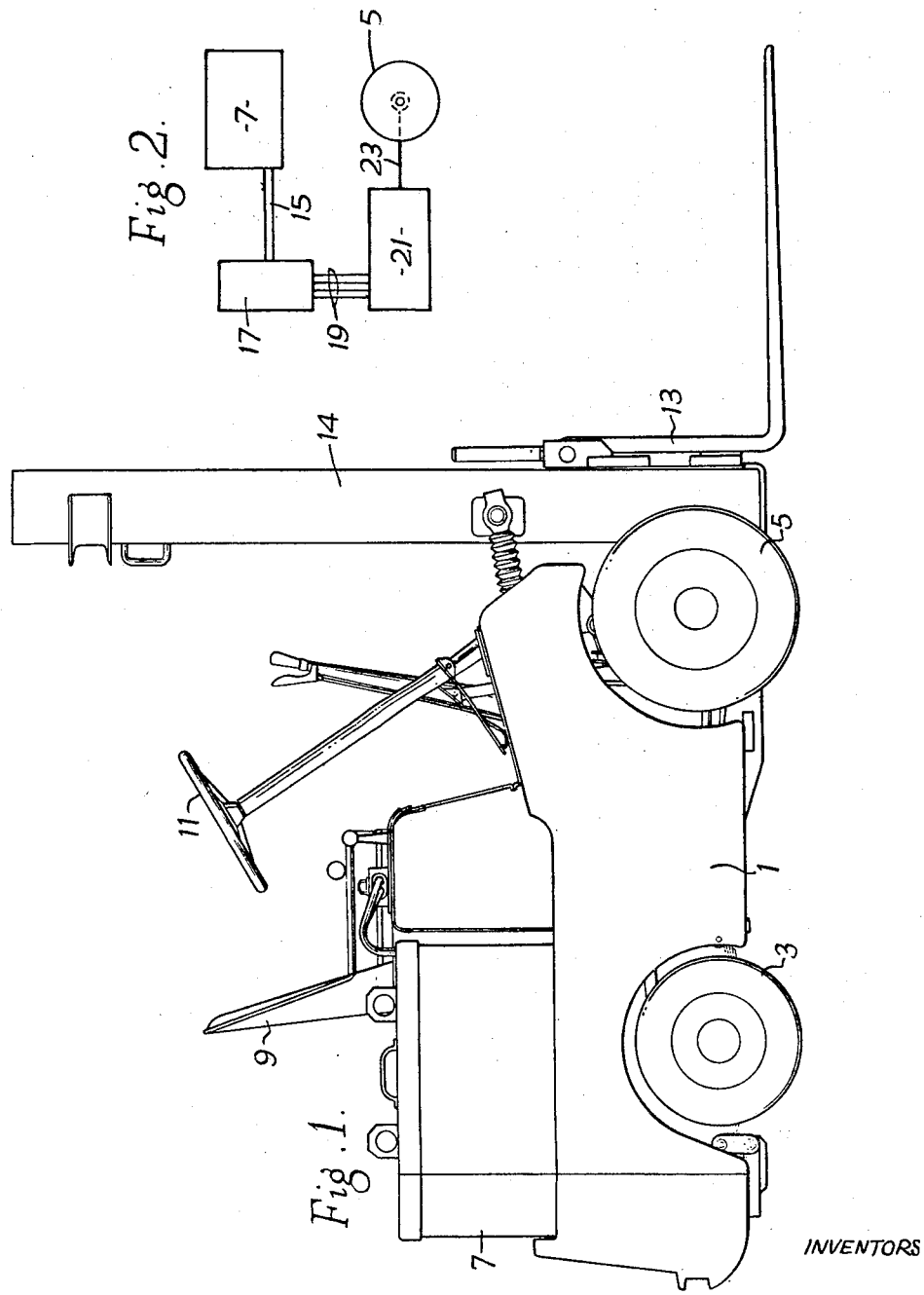

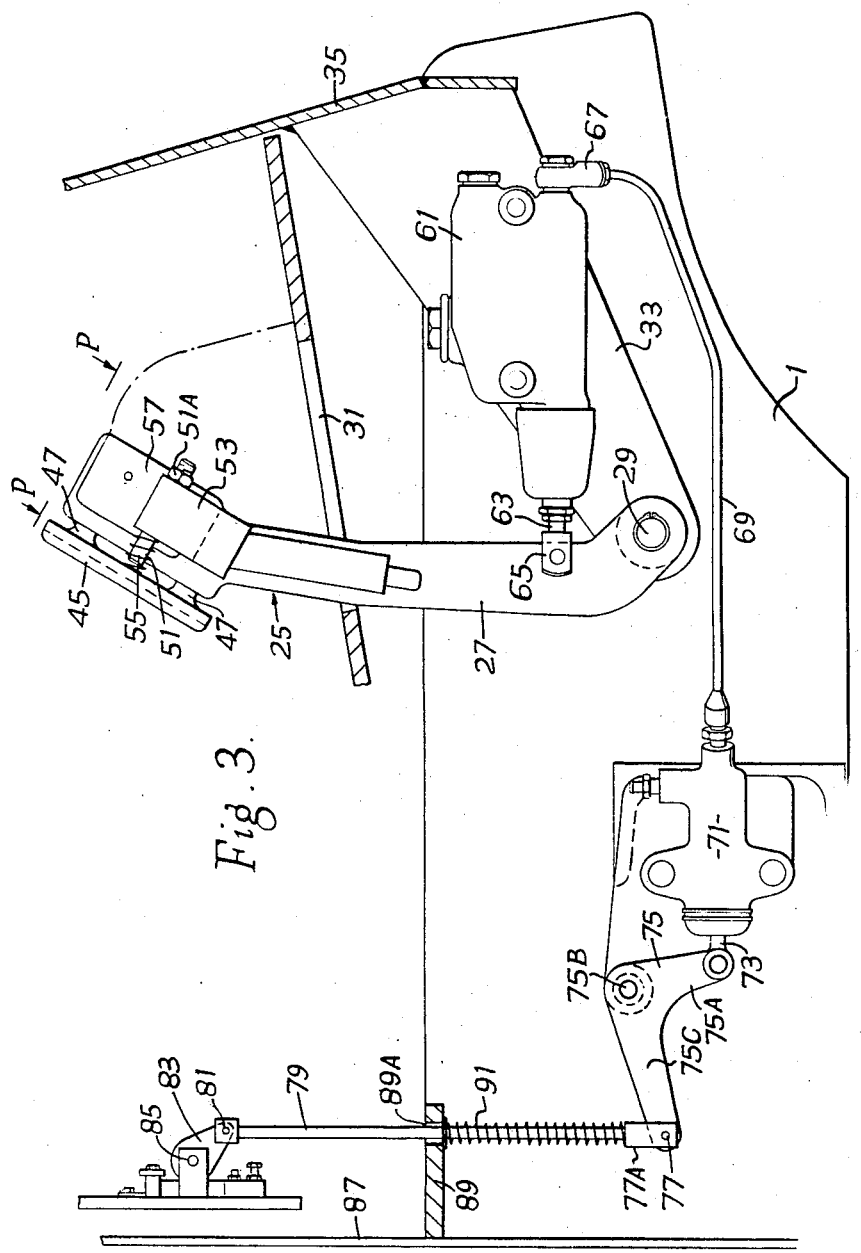

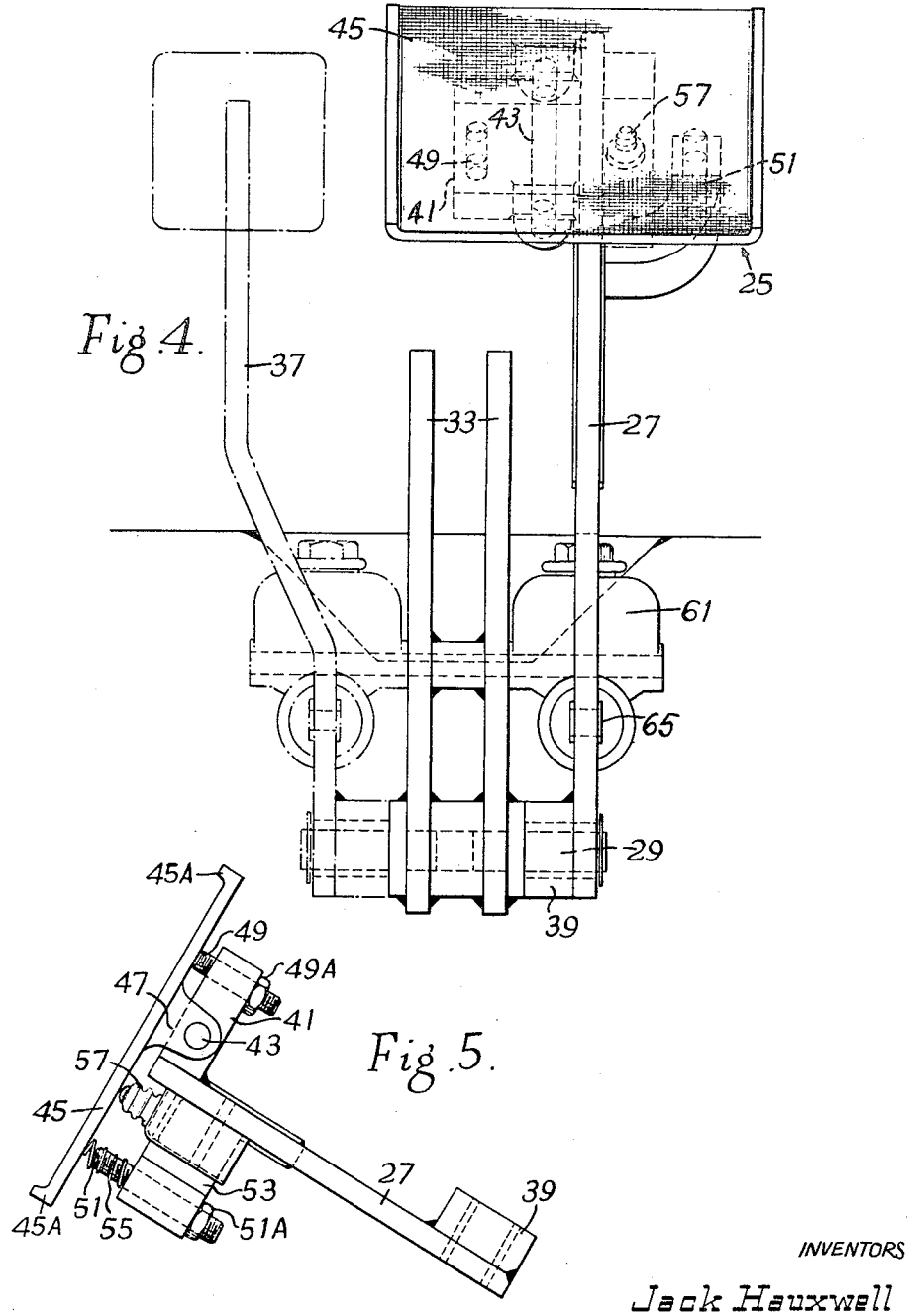

Inventors
Jack Hauxwell
Basil Haden-Scott 3,158,221
FORK-LIFT TRUCKS
Jack Hauxwell and Basil B. Haden-Scott, both of
Orwell Works, Ipswich, Suffolk, England
Filed Dec. 1, 1961, Ser. No. 156,210
Claims priority, application Great Britain Oct. 27, 1961
9 Claims. (Cl. 180—77)

This invention relates to fork lift trucks, and more particularly to the provision of a battery-powered, electric motor driven, fork lift truck.

The control of a fork lift truck tends to be complex compared with the control of a normal motor vehicle, since the operator is required not only to drive the vehicle, necessitating the use of a steering wheel, forward/reverse direction controlling means, some form of speed control, and brakes, but also to control the fork lift device itself. It is therefore important to simplify as far as possible the controls which the driver must operate.

According to the present invention, in a battery powered, electric motor driven fork-lift truck a single foot pedal is arranged to control electrical circuits governing the speed of the electric motor and governing the direction of rotation of the electric motor.

The invention will now be described, by way of example, with reference to the accompanying diagrammatic drawings, in which:

FIGURE 1 is a side elevation of a forklift truck;
FIGURE 2 is a block diagram of the electrical system of the truck of FIGURE 1;
FIGURE 3 is a side elevation of a foot pedal and an associated hydraulic linkage connected to that foot pedal;
FIGURE 4 is an elevation of the foot pedal shown in FIGURE 3, as viewed from the left of that figure;
FIGURE 5 is a view from above of the foot pedal shown in FIGURES 3 and 4, the direction of viewing being that indicated by the arrows P—P; and
FIGURE 6 is a circuit diagram of the relevant parts of the electrical system of the truck shown in FIGURES 1 and 2.

Fork lift trucks are well known in the art, and the fork lift truck shown in FIGURE 1 is orthodox in that it comprises a body 1 mounted on rear steering road wheels 3 and forward driving road wheels 5, a battery 7 being mounted on the part of the body behind a driving seat 9 on which the driver of the truck sits and close to the steering wheel 11. The lifting forks 13 are mounted on a carriage running in upright guides 14 fixed to the front end of the body 1, so as to be movable vertically. The upright guides 14 and, therefore, the forks 13 are also capable of being pivoted through a limited forward and rearward angular movement.

The present invention is concerned with the control of the vehicle for movement in the forward and reverse directions, and therefore no detailed description of the other parts of the fork lift truck are given, it being understood that these may be in accordance with any of the known arrangements.

The components utilised to effect forward and reverse movement of the truck are indicated in FIGURE 2, and include the battery 7 connected by power leads 15 to a contactor unit 17 itself connected by leads 19 to a direct current reversible motor 21. Motor 21 is connected through an orthodox transmission 23 to the two driving road wheels 5.

In the forward and reverse operation of the truck, two distinct controls must be effected, namely, control of the direction of travel and control of the speed of travel. According to the present invention, both of these controls are effected by the driver through the medium of a single foot pedal 25 (see FIGURE 3). Foot pedal 25 is in the form of an upwardly extending lever 27 pivotally mounted at its lower end on a horizontal pin 29 which extends transversely of the truck below the truck foot plate 31, this pin 29 being carried by lugs 33 extending rearwardly from a front member 35 of the truck body 1 to which they are welded. Pin 29 also carries a brake pedal 37 indicated in FIGURE 4 together with its hydraulic master cylinder and connected in an orthodox manner to the road wheel brakes of the truck.

Lever 27 is in the form of a flat bar provided at its lower end with a sidewardly extending boss 39 which serves to provide an extended bearing surface on the pin 29. To the upper end of lever 27 is welded a block 41 which extends sidewardly from the lever and is bored in the direction of the length of the lever 27 to accept a pin 43 which acts as a pivot for a pedal plate 45 provided with two spaced lugs 47 which engage the parts of the pin 43 which lie at opposite ends of the block 41. The pedal plate 45 extends across the rear edge of the upper end of the lever 27 and at its opposite side edges is provided with upturned flanges 45A.

Rocking movement of the pedal plate 45 on the pin 43 is limited to a travel of a few degrees by two stops 49 and 51, each of which is in the form of a screwthreaded rod fitting into a screwthreaded hole, the hole in the case of stop 49 being formed in the block 41 and the hole in the case of stop 51 being formed in a block 53 secured to the side of lever 27 remote from the block 41. The rods of stops 49 and 51 are fitted with lock nuts 49A and 51A respectively. A helical compression spring 55 is fitted about the rearward end of the rod forming stop 51 and acts between the block 53 and the forward side of the pedal plate 45. This spring normally holds the pedal plate pressed into contact with the stop 49.

Mounted on the lever 27 is a two-way micro switch 57 the actuator of which is pressed against the forward face of the pedal plate 45. The stops 49 and 51 are so adjusted that, when the spring 55 holds the pedal plate against the stop 49, a movable contact of switch 57 engages a "forward" contact of the switch, and when the pedal plate is forcibly tipped against the action of the spring 55 to contact the stop 51, the movable contact of the switch 57 engages a "reverse" contact of the switch.

A hydraulic master cylinder 61, of the type used in motor vehicle hydraulic brake systems, is mounted on one of the lugs 33 in front of the lever 27 with its operating rod 63 connected by a clevis 65 to that lever. Forward movement of lever 27 and movement of the operating rod causes the displacement of hydraulic fluid from the master cylinder 61 through a union 67 at the front end of the cylinder 61 into a pipe 69 by which it is fed to a slave cylinder 71. The ram or piston of slave cylinder 71 is connected to a guided push rod 73 connected to one arm 75A of a bellcrank lever 75 mounted on a pivot 75B and having its second arm 75C coupled by a clevis pin 77 of a clevis 77A to the lower end of a rod 79. Rod 79 is attached at its upper end by a clevis pin 81 to a crank 83 of the operating shaft 85 of a drum electrical controller 87. At about its mid-length the rod 79 is guided in a slot 89A in a lug 89 fixed to the truck frame, and a helical compression spring 91 encircling the part of the rod 79 below the lug 89 acts between lug 89 and the clevis 77A to bias the connecting rod 79 and thus the end of crank 83 downwardly. This effects return of the controller 87 to its "off" position.

Referring now to the circuit diagram shown in FIGURE 6, the electric motor 21 which effects forward and reverse movements of the truck is a series wound motor the direction of rotation of which is reversed by reversing the connection of the motor field windings 21F, and speed control of which is effected by the insertion in the motor circuit of two series connected resistances R1 and R2 and by selectively short-circuiting one or both of these resistances.

The contactor unit 17 includes the drum type controller 87, having five notches or positions selected by rotation of its operating shaft 85. The controller includes five movable contact blades indicated in FIGURE 6 by I to V respectively, and the settings of these blades, in accordance with the selected notch, controls the activation of the operating coils of various electrical contactors or relays. Blade I has two operating positions, in one of which it is isolated and in the second of which it engages a contact IB. Blades III, IV and V are connected together electrically but not mechanically, and each is movable between two operating positions. Blade III when in its first position engages a contact IIIA and when in its second position engages a contact IIIB. Blade IV when in its first position engages a contact IVA and when in its second position engages a contact IVB. Blade V when in its first position is isolated and when in its second position engages a contact VB. Blade II is also movable between two operating positions, in the first of which it is isolated and in the second of which it engages a contact IIB. A lead 101 connects the positive terminal of the battery 7 through a switch 102, of the type operated by a removable key and such as is used as a vehicle ignition switch, to the blade I. Contact IB is connected to contact IIIA. Contact IVA is connected to contact VB.

Three contactors AC–1, AC–2 and AC–3, having operating coils AC–1C, AC–2C, AC–3C and contacts AC–1S, AC–2S and AC–3S respectively, are controlled by the controller 87. Thus, the negative terminal of the battery 7 is connected by a lead 103 through a fuse 104 to one end of each of these contactor coils, and the other ends of the three coils AC–1C, AC–2C and AC–3C are connected respectively to contacts VB, IIIB, and IVB. The operating coil AC–1C is shunted by a "slugging" resistance SR, the function of which is to delay release of the contactor slightly so as to ensure that it does not release as the controller passes from notch to notch.

Contact IIB is connected by a lead 105 to operating coils RCFC and RCRC of a forward contactor RCF and a reversing contactor RCR respectively. The other ends of these two coils are connected respectively to the "forward" F and "reverse" R contacts of the micro switch 57. The movable contact RS of switch 57 is connected through a brake interlock switch BIS to the lead 103. This interlock switch is so arranged that it is held open when the truck brake is applied and is closed only when the truck brake is released. Forward contactor RCF includes a movable blade X connected by one of the leads 19 to one end of the motor field windings 21F and movable from a rest position, in which it engages a contact XA, connected another conductor 19 to one of the brushes of motor 21, upon energization of the coil RCFC to engage a contact XB connected by one of the leads 15 to the negative terminal of battery 7. Reversing contactor RCR includes a movable blade Y connected by another of the leads 19 to the other end of the motor field windings 21F and movable from a rest position, in which it engages a contact YA connected to the contact XA, upon energization of the coil RCRC to engage a contact YB connected to the contact XB. It will be appreciated that when both coils RCFC and RCRC are unenergized, there is no complete path from the motor armature through the field winding 21F to the battery negative terminal, that when coil RCFC is energized such a path exists, extending through the field coil 21F in the direction of the arrow f, and that when coil RCRC is energized such a path exists, extending through the field coil 21F in the opposite direction designated by the arrow r. Contactor RCF also includes a second blade XX movable with blade X and engaging contacts XXA and XXB respectively in its two positions. Contact RCR also includes a second blade YY movable with blade Y and engaging contacts YYA and YYB in its two positions respectively. Contact XXA is joined to contact YYB. Contact XXB is joined to contact YYA. Blade XX is connected by a conductor 107 with contact IIIA of the drum controller 87. Blade YY is connected by a conductor 109 to the three blades III, IV and V of the drum controller.

A conductor 110 connects the second motor brush through resistance R2, resistance R1 and the contacts AC–1S of contactor AC–1 to the positive terminal of the battery 7 when those contacts are closed. The contacts AC–2S are arranged to shunt, when engaged by the contactor AC–2, the resistance R1. The contacts AC–3S are arranged to shunt, when engaged by contactor AC–3 both resistance R1 and resistance R2 through closed contacts AC–1S.

In use of the fork lift truck, initially the switch 102 will be open and the vehicle brake will be applied, so causing switch BIS to be open. The blades of the controller 87 will all be in their first positions, as shown in FIGURE 6, and as a result the motor circuit will be open due to the open state of contactors AC–1, AC–2, AC–3, RCF and RCR. Upon insertion of the key of switch 102 and closing of that switch, controller blade I is connected to the positive terminal of the battery but no further action takes place. The pedal plate 45 will be in the position in which it engages stop 49 so that the micro-switch 57 is set to energise contactor coil RCFC, the circuit of this coil remaining broken at controller blade II and at brake interlock switch BIS. If the driver of the truck releases the brake and now depresses the pedal plate 45 by pressing upon its left-hand side, the plate will remain in engagement with the stop 49, so leaving the state of the switch 57 unchanged, and the lever 27 will move forwardly to operate the master cylinder 61 to displace the push rod 73 rearwardly and the connecting rod 79 upwardly, so moving the operating shaft 85 of the controller 87 from its off position to its first notch, causing controller blade I to engage contact IB. This completes an energising circuit through coil AC–1C leading from the battery positive terminal through control blade I, contact IB, contact IIIA, blade III, blade IV, contact IVA, contact VB, coil AC–1C to the battery negative terminal. Contactor AC–1 thus closes. No current flows through the motor since the contactor RCF is not energised, the circuit being broken at controller blade II. Further depression of the foot pedal 25 will move controller 87 to its second notch, whereupon its blade I remains engaged with contact IB and blade II engages contact IIB. This completes a circuit leading from the positive terminal of the battery through the contactor AC–1 and contacts AC–1S, the controller blade II, contact IIB, the coil RCFC, the microswitch 57 forward contact F, and the brake interlock switch BIS which is closed as the brake has been released, to the battery negative terminal, and contactor RCF is energised and its blades X and XX engage contacts XB and XXB respectively. A power circuit through the motor is then established, the sense of the current flow in the field winding 21F, as indicated by arrow f, being that required for forward movement of the truck, and the series connected resistances R1 and R2 limiting the current flow to give a low starting acceleration.

Further depression of the foot pedal 25 will move controller 87 to its third notch, whereupon its three blades I, II and III are respectively in engagement with the controller contacts IB, IIB and IIIB. This movement breaks the contact between controller blade III and contact IIIA, but the coil AC–1C is not deenergized as a result thereof since a parallel path holding it energised has already been established through blades XX and YY and controller blade IV. The engagement of blade III with contact IIIB effects energisation of the coil AC–2C and closes the contacts AC–2S, so short-circuiting the resistance R1 and increasing the voltage applied to the motor 21, which speeds up.

Upon still further depression of the foot pedal 25, the controller 87 is moved to its fourth notch, in which the four blades I, II, III, IV are in engagement respectively with the contacts IB, IIB, IIIB, IVB. This disengages blade IV from controller contact IVA, so that contactor coil AC–1C is deenergised, and contactor AC–1 opens. This does not affect the coil RCFC, which is now energised by current flowing through contactor AC–2, resistance R1, and blade II of the controller. The movement of blade IV into engagement with contact IVB energises the coil AC–3C, so that contacts AC–3S close. It will be seen that the contactors AC–2 and AC–3 now connect the resistances in parallel with one another and in series with the motor. This permits a further motor voltage increase and speed increase.

When the foot pedal 25 is fully depressed to move controller 87 to its fifth notch, the blades I, II, III, IV, V are respectively in contact with their contacts IB, IIB, IIIB, IVB, and VB. Engagement of blade V and contact VB again effects energisation of the coil AC–1C, and closure of its contacts AC–1S. There then exists a direct path from the battery positive terminal through the contacts AC–1S and AC–3S to the motor 21, and the motor speed rises to its full working value.

Upon a progressive release of the foot pedal, the controller 87 will pass downwardly through its notches or positions described till it reaches the off position.

When it is desired to reverse the direction in which the truck is moving, it is only necessary for the driver to transfer his foot from the left-hand side of the foot pedal 25 to the right-hand side. He can only do this by removing his foot from the pedal, whereupon the controller 87 rapidly reverts to its off position. Upon pressure on the right-hand side of the pedal 25, the pedal plate 45 is tilted against the biassing effect of the spring 55 until it engages the stop 51, in which position the movable contact of the micro switch 57 engages the "reverse" contact R. This modifies the operation of the electrical circuit, since the coil RCFC remains deenergised and coil RCRC is energised. As a result, blades X and XX remain stationary but blades Y and YY move to their second positions in which they engage respectively contacts YB and YYB. This change in operation changes the direction of the current flow in the motor field winding 21F, as indicated by the arrow r but has no other effect, the continued depression of the pedal 25 controlling the speed of motor 21 in the manner described above, but the motor now running in the reverse direction to move the truck backwards instead of forwards.

It will be appreciated that at each notch of the controller 87 the motor speed increases until the back E.M.F. brush and copper losses balance the voltage applied to the motor armature, so that the resistances R1 and R2 serve to control the voltage applied to the motor armature. This control of the voltage can be applied in other ways known to those skilled in the art.

We claim:

1. An electric motor driven vehicle having first electrical instrumentalities for varying the speed of the motor, and second electrical instrumentalities for controlling the direction in which the motor operates, said vehicle being characterized by the following:
   (A) control of both speed and direction of travel of the vehicle are provided for by a single control element which is mounted on the vehicle for motion in opposite directions along a first defined path, and for motion in opposite directions between defined limits along a second defined path;
   (B) the control element is operatively connected with said first electrical instrumentalities to effect regulation of the speed at which the motor is operated either forwardly or backwardly solely in accordance with the position of said control element along its first defined path; and
   (C) the control element is operatively connected with said second electrical instrumentalities to effect operation of the motor in one direction at a speed determined by the position of the control element along said first defined path when the control element is at one of its limits of motion along said second defined path and to effect operation of the motor in the opposite direction at a speed determined by the position of the control element along said first defined path when the control element is at the other of its limits of motion along said second defined path.

2. In a vehicle of the type that is propelled either forwardly or in reverse by a reversible electric motor, at a speed proportional to the speed at which the motor is driven:
   (A) a foot actuated accelerator member mounted on the vehicle for back and forth motion along a defined path;
   (B) electrical instrumentalities controlled by the accelerator member for varying the speed at which the motor is driven either forwardly or rearwardly in correspondence with the position of the accelerator member along said path;
   (C) other electrical instrumentalities providing forward and reverse energizing circuits for the motor, and including manually operable circuit selector means for selectively rendering either the forward or the reverse energizing circuit effective;
   (D) and means mounting said manually operable circuit selector means on the accelerator member for bodily movement therewith and for movement in opposite directions relative thereto between defined circuit selecting limits, and in position to be optionally actuated to one circuit selecting limit of motion or the other by the foot which a driver of the vehicle applies to the accelerator member when adjusting the speed at which the motor is driven.

3. In a vehicle of the type that is propelled at different speeds by an electric motor in directions depending upon the direction of rotation of the motor:
   (A) an accelerator lever pivotally mounted on the vehicle;
   (B) a foot engaging pad carried by the lever to facilitate actuation thereof;
   (C) means mounting the foot engaging pad on the lever for bodily motion therewith and for tilting motion relative to the lever between defined limits;
   (D) means yieldingly biasing the pad to one of said limits;
   (E) accelerator governed electrical instrumentalities for controlling the speed of operation of the electric motor in accordance with the position of the accelerator lever on its pivot;
   (F) and other electrical instrumentalities governed by said foot engaging pad, including a forward energising circuit for the motor rendered operative by said pad at one of its limits of tilting motion to effect operation of the electric motor in one direction, and a reverse energizing circuit for the motor rendered operative by the pad at its other limit of tilting motion to effect operation of the motor in the opposite direction.

4. The vehicle of claim 3, wherein the forward energising circuit for the motor is rendered operative by said foot engaging pad when the pad is at said limit to which it is biased.

5. The vehicle of claim 3, further characterized by: switch means which must be closed before the motor can be operated, said switch means being coupled to the vehicle brakes to open when the brakes are applied and to close when the brakes are released.

6. In a vehicle of the type that is propelled either forwardly or in reverse by a reversible electric motor, at a speed proportional to the speed at which the motor is driven:

(A) a foot actuated accelerator member mounted on the vehicle for back and forth motion along a defined path;
(B) electrical instrumentalities controlled by the accelerator member for varying the speed at which the motor is driven in correspondence with the position of the accelerator member along said path;
(C) other electrical instrumentalities providing forward and reverse energizing circuits for the motor, and including circuit selector means carried by the accelerator member for selectively rendering either the forward or the reverse energizing circuit effective, said circuit selector means comprising
  (1) a double throw single pole switch,
  (2) and a manually operable switch actuating pad;
(D) and means mounting said manually operable switch actuating pad on the accelerator member for bodily motion therewith and for tilting switch actuating motion relative thereto, and in position to be operated by the foot which a driver of the vehicle applies to the accelerator member when adjusting the speed at which the motor is driven.

7. In a vehicle of the type that is propelled either forwardly or in reverse by a reversible electric motor, at a speed proportional to the speed at which the motor is driven:
(A) a foot actuated accelerator member mounted on the vehicle for back and forth motion along a defined path;
(B) electrical instrumentalities controlled by the accelerator member for varying the speed at which the motor is driven in correspondence with the position of the accelerator member along said path, and including resistance means connected in series with the motor and which are shunted as a consequence of actuation of the accelerator member to cause high speed operation of the motor;
(C) other electrical instrumentalities providing forward and reverse energizing circuits for the motor, and including manually operable circuit selector means for selectively rendering either the forward or the reverse energizing circuit effective;
(D) and means mounting said manually operable circuit selector means on the accelerator member in position to be operated by the foot which a driver of the vehicle applies to the accelerator member when adjusting the speed at which the motor is driven.

8. In a vehicle of the type that is propelled either forwardly or in reverse by a reversible electric motor, at a speed proportional to the speed at which the motor is driven:
(A) a foot actuated accelerator member mounted on the vehicle for back and forth motion along a defined path;
(B) electric instrumentalities for varying the speed at which the motor is driven in correspondence with the position of the accelerator member along said path, comprising
  (1) a switching device having movable contactor means,
  (2) and means providing a motion transmitting connection between the accelerator member and the movable contactor means whereby the latter moves in correspondence with back and forth motion of the accelerator member;
(C) other electrical instrumentalities providing forward and reverse energizing circuits for the motor, and including manually operable circuit selector means for selectively rendering either the forward or the reverse energizing circuit effective;
(D) and means mounting said manually operable circuit selector means on the accelerator member in position to be operated by the foot which a driver of the vehicle applies to the accelerator member when adjusting the speed at which the motor is driven.

9. The vehicle of claim 8, wherein said motion transmitting connection comprises a hydraulic transmission system that includes a master cylinder connected to and operated by the accelerator member during back and forth motion thereof, and a slave cylinder operated by the master cylinder and drivingly connected with said movable contactor means.

References Cited in the file of this patent
UNITED STATES PATENTS

| | | |
|---|---|---|
| 1,606,547 | Ward | Nov. 9, 1926 |
| 1,919,930 | Cash | July 25, 1933 |
| 2,645,297 | Wennberg et al. | July 14, 1953 |